United States Patent [19]

Suzuki et al.

[11] Patent Number: 4,746,881
[45] Date of Patent: May 24, 1988

[54] EQUALIZER FOR FREQUENCY INDEPENDENT AND DEPENDENT TRANSMISSION LOSS COMPONENTS WITH A PILOT USED FOR THE FREQUENCY INDEPENDENT COMPONENT

[75] Inventors: Toshio Suzuki; Satoshi Hiraide; Takashi Shinozuka, all of Tokyo, Japan

[73] Assignee: NEC Corporation, Japan

[21] Appl. No.: 736,943

[22] Filed: May 22, 1985

[30] Foreign Application Priority Data

May 24, 1984 [JP] Japan ................. 59-105162

[51] Int. Cl.⁴ .................. H04B 3/12; H04B 3/14
[52] U.S. Cl. ..................... 333/16; 330/304; 381/103; 379/340; 333/18
[58] Field of Search ............... 333/16, 18, 28 R, 20 T; 330/52, 304; 119/170 A, 170.4; 375/11, 12; 381/103; 453/63; 178/63 E; 370/79; 379/340, 344

[56] References Cited

U.S. PATENT DOCUMENTS

| | | | |
|---|---|---|---|
| 2,768,353 | 10/1956 | Mansson | 333/16 |
| 2,881,396 | 4/1959 | Schraivogel | 333/28 R |
| 3,838,230 | 9/1974 | Bohman et al. | 333/16 |
| 4,028,644 | 6/1977 | Niiro | 178/63 E X |
| 4,258,340 | 3/1981 | Ryu | 333/18 |
| 4,459,698 | 7/1984 | Yumoto et al. | 333/18 X |
| 4,500,999 | 2/1985 | Takatori et al. | 333/18 X |

OTHER PUBLICATIONS

1984 National Convention Record of the Institute of Electronics & Electrical Communication Engineers of Japan, Paper No. 2134, entitled "A√f Step Equalizer", by Akihiko Takada, et al.

Primary Examiner—Eugene R. LaRoche
Assistant Examiner—Benny Lee
Attorney, Agent, or Firm—Laff, Whitesel, Conte & Saret

[57] ABSTRACT

In addition to an information signal subjected to a frequency dependent and a frequency independent loss component and delivered to an automatic equalizer through a transmission path which is typically a subscriber's communication path between a subscriber's terminal equipment and an exchange, an equalizer input signal comprises a pilot signal subjected to the frequency independent loss component alone. The equalizer comprises a first equalizer (26, 27, 36) responsive to a pilot signal component derived from the pilot signal for compensating for the frequency independent loss component. A second equalizer (31, 32, 37) compensates for the frequency dependent loss component in response to an information signal component derived from the information signal. The first and the second equalizers are cooperative in various manners in equalizing the input signal into an equalizer output signal. The pilot and the information signal components are extracted either directly or indirectly from the input signal. The output signal is fed back to a frequency dependent component detector (31) either directly or indirectly.

14 Claims, 6 Drawing Sheets

EQUALIZER FOR FREQUENCY INDEPENDENT AND DEPENDENT TRANSMISSION LOSS COMPONENTS WITH A PILOT USED FOR THE FREQUENCY INDEPENDENT COMPONENT

BACKGROUND OF THE INVENTION

This invention relates to an automatic equalizer for use in equalizing an equalizer input signal supplied through a transmission path or channel with the input signal subjected to a transmission loss which can be classified into a frequency independent and a frequency dependent loss component.

For convenience of expression, the following expressions are used: CMI=Coded Mark Inversion; AMI=Alternate Mark Inversion; WAL1=First Walsh function code, and WAL2=Second Walsh function code.

The transmission path of the type described, is typically a subscriber's communication path between a subscriber's terminal equipment, such as a telephone set, and an exchange. In this event, the equalizer is for use in each of the subscriber's terminal equipment and each input circuit of the exchange, such as each subscriber line circuit. The subscriber's communication path may be a conductor in a cable.

During transmission through such a transmission path, an electrical signal is subjected to a transmission loss. In the manner known in the art, it is possible to classify the transmission loss into two components which will herein be called a first and a second loss component. The first loss component is frequency independent, namely, has no frequency dependency. The second loss component is frequency dependent or has a frequency dependency. Typically, the second loss component increases with the frequency and has a gradient which is linearly proportional to the square root of the frequency.

Various factors either individually or collectively influence the first and the second loss components. The factors are, for example, the kind of the transmission path and the diameter and the length thereof. The first and the second loss components have a mutual relationship which is not unique. An automatic equalizer is therefore desired, which equalizes the equalizer input signal individually for the first and the second loss components, that is, which separately compensates for the first and the second loss components.

Various automatic equalizers of the type are already known. By way of example, an automatic equalizer is described by Toshiro Suzuki et al in a paper submitted to "1983 IEEE International Solid-State Circuits Conference" as Paper No. WPM 7.3 under the title of "A CMOS Switched Capacitor Variable Line Equalizer." The equalizer carries out equalization according to a plurality of compensation characteristics which are determined on the basis of an average loss characteristic of various cables. Another automatic equalizer is reported by Akihiko Takada et al in a paper contributed to "Syôwa-59-nendo Densi Tûsin Gakkai Soôgô Zenkoku Taikai Yokô (1984 National Convention Record of the Institute of Electronics and Electrical Communication Engineers of Japan)" as Paper No. 2314 under the title of "A $\sqrt{f}$ Step Equalizer" according to contributors' translation. The latter equalizer comprises a first and a second equalizer which individually compensate for the first and the second loss components and which cooperate in producing an equalized signal as an equalizer output signal. The first and the second equalizers are controlled by a peak voltage of the equalizer output signal in accordance with a distribution law predesigned between those amounts of equalizaton which the first and the second equalizers should carry out. In other words, the first and the second equalizers are subjected to a common control.

Other examples are disclosed in U.S. Pat. No. 4,459,698 issued to Osamu Yumoto et al and in an article which is contributed by Masayuki Ishikawa et al to the IEEE Journal of Solid-State Circuits, Vol. SC-19, No. 4 (August 1984), pages 506-509, and which has a title of "A CMOS Automatic Line Equalizer LSI Chip Using Active-RC Filtering." Like the automatic equalizers according to Takada et al and Suzuki et al, conventional automatic equalizers are disadvantageous in that the first and the second loss components are compensated for only in a predetermined manner and in that an error inevitably remains in the equalized signal to a certain extent.

SUMMARY OF THE INVENTION

It is therefore an object of the present invention to provide an automatic equalizer which is of the type described above and is capable of compensating for frequency independent and dependent transmission loss components separately to optimum amounts of compensation, respectively.

It is another object of this invention to provide an automatic equalizer of the type described, which skillfully compensates for the frequency independent component with compensation carried out also for the frequency dependent component to an optimum degree independently of the frequency independent component.

An automatic equalizer to which this invention is applicable, is responsive to an equalizer input signal supplied through a transmission path with the input signal subjected to a transmission loss for producing an equalizer output signal, where the transmission loss is classified into a first and a second loss component which have substantially no frequency dependency and a frequency dependency, respectively. The automatic equalizer comprises a first and a second equalizer which are for separately compensating for the first and the second loss components, respectively, and are cooperative in producing the equalizer output signal with the first and the second loss components compensated for. According to this invention, the automatic equalizer is characterised in that the input signal is made to comprise a pilot signal in addition to an information signal where the information and the pilot signals are susceptible to both the first and the second loss components and to the first loss component alone, respectively, and that: the first equalizer comprises first loss component detecting means responsive to a pilot signal component derived from the pilot signal and having the above-mentioned no frequency dependency for detecting the first loss component to produce a control signal, and first loss component compensating means responsive to the control signal for compensating for the first loss component; the second equalizer being responsive to an information signal component derived from the information signal and having both the afore-mentioned no frequency dependency and the frequency dependency for compensating for the second loss component.

DESCRIPTION OF THE PREFERRED EMBODIMENTS

Figure 1:
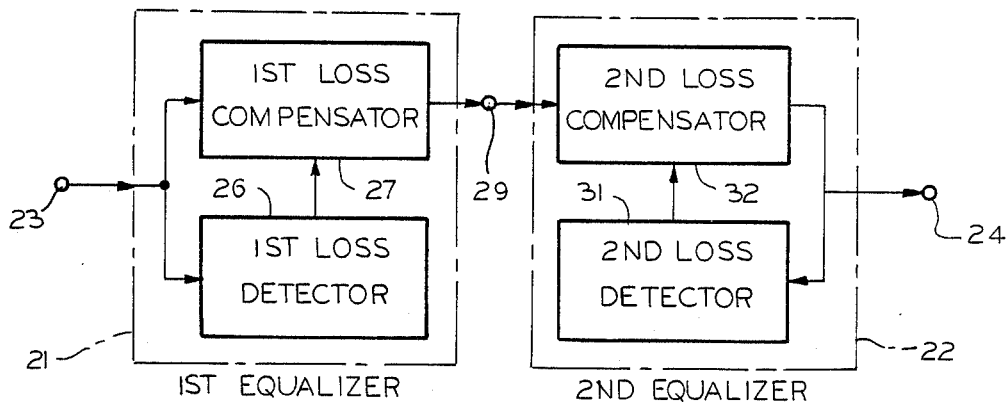
FIG. 1 is a block diagram which outlines an automatic equalizer according to the instant invention.

Referring to FIG. 1, a description will be given in general terms, with regard to an automatic equalizer, according to the present invention. The automatic equalizer comprises first and second equalizers 21 and 22 which are cooperative in various manners which will be described as the description proceeds. The automatic equalizer has an equalizer input terminal 23 supplied with an equalizer input signal through a transmission path or channel of the type described hereinabove. It is possible to understand that the input terminal 23 also shows a part of the transmission path. Until arrival at the input terminal 23, the input signal is subjected to a transmission loss.

It is already described heretobefore and will presently be described more in detail, that the transmission loss can be classified into a first and a second loss component. The first loss component has substantially no frequency dependency. The second loss component has a frequency dependency. The first and the second equalizers 21 and 22 are for separately compensating for the first and the second loss components, respectively, and for cooperatively equalizing the input signal to deliver an equalized signal to an equalizer output terminal 24 as an equalizer output signal.

The input signal which appears at terminal 23 comprises an information or message signal. It has been confirmed, as will shortly be exemplified, that the information signal has only a small low-frequency component and is scarcely adversely affected when there is a cut off of low frequencies. In consideration of this fact, according to this invention, the input signal includes a pilot signal in addition to the information signal, in a frequency band at a low frequency. In a manner which will become clear, the pilot signal is used in determining an amount or degree of compensation which should be used to provide for a compensation of the first loss component.

The first equalizer 21 comprises a loss component detecting arrangement 26 for the first loss component. Responsive to a pilot signal component derived from the pilot signal in various manners which will be described as the description proceeds, the arrangement 26 determines or finds the amount of compensation for the first loss component and produces a control signal related to the amount. It is herein said simply that the arrangement 26 is for detecting the first loss component.

A loss component compensating arrangement 27 is for compensating for the first loss component in accordance with the control signal. For the automatic equalizer being illustrated, the input signal is delivered to the loss component detecting and compensating arrangements 26 and 27. The loss component compensating arrangement 27 supplies an intermediate output terminal 29 with an intermediate output signal in which the first loss component is optimally compensated for. Inasmuch as related to the first loss component, the arrangements 26 and 27 will be named first loss component detecting and compensating arrangements.

For the second equalizer 22, an information signal appearing at terminal 29 has a component which is derived from the information signal, in various manners, like the pilot signal component. Responsive to the information signal component, another loss component detecting arrangement 31 decides upon or finds an amount of compensation required for the second loss component and produces another control signal which is related to the amount of compensation to be provided for the second loss component and which is herein called a gain control signal. The detecting arrangement 31 may simply be said to detect the second loss component and will be called a second loss component detecting arrangement.

Another loss component compensating arrangement 32 is for compensating for the second loss component in compliance with the control signal and is referred to herein as a second loss component compensating arrangement. For the illustrated automatic equalizer, the second loss component compensating arrangement 32 is supplied with the intermediate output signal and delivers the equalized signal to the equalizer output terminal 24 as the equalizer output signal. The equalizer output signal is fed back directly to the second loss component detecting arrangement 31. It is to be noted here that the information signal component should be derived in this event from the equalizer output signal.

Figure 2:
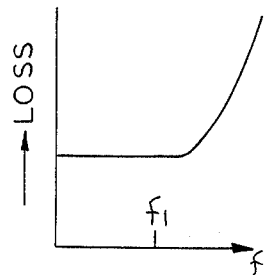
FIG. 2 exemplifies a frequency dependency of a transmission loss which an electrical signal undergoes during transmission through a transmission path.
Figure 3:
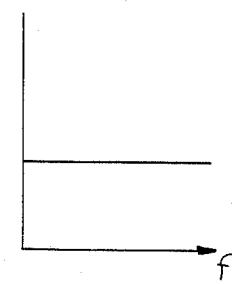
FIG. 3 shows a frequency independent component of the transmission loss illustrated in FIG. 2.
Figure 4:
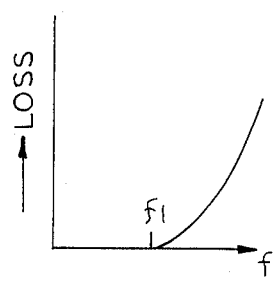
FIG. 4 shows a frequency dependent component of the transmission loss depicted in FIG. 2.

Turning to FIGS. 2 through 4, the transmission loss has a frequency dependency exemplified in FIG. 2 with the frequency f shown along the abscissa. The transmission loss is substantially constant below a certain frequency $f_1$ and gradually increases with the frequency f above that frequency $f_1$. It is possible to classify or decompose the transmission loss into the first and the second loss components which are described heretobefore and depicted in FIGS. 3 and 4, respectively. It is now understood that the above-mentioned pilot signal is subjected to the first loss component alone.

Figure 5:
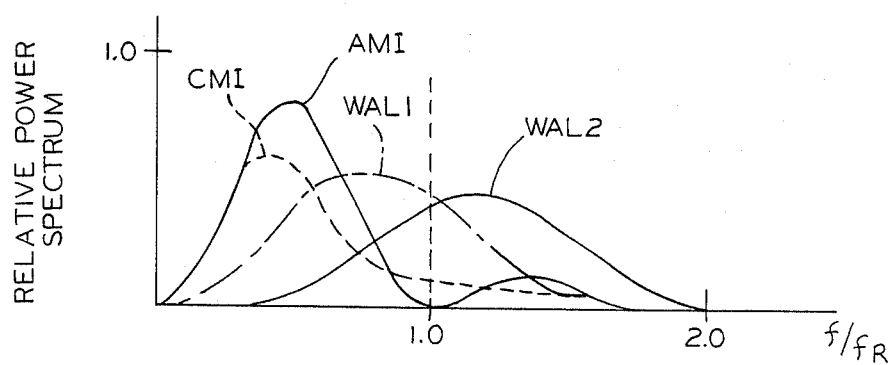
FIG. 5 shows power spectra for several types of transmission codes.

Further turning to FIG. 5, relative power spectra are depicted for several types of transmission codes which are ordinarily used in the art in carrying the information signal. The abscissa represents a normalized frequency $f/f_R$ where $f_R$ represents a repetition frequency which code pulses of each sequence have.

In any one of the code types of CMI, AMI, WAL1, and WAL2 (code mark inversion, alternate mark inversion, and first and second Walsh codes, respectively), the information signal has only a small low frequency component and is little affected even cut off at a low frequency. It is now obviously possible to use in a frequency band of the low frequency a pilot signal which can readily be superposed on the information signal and separated for extraction from an electrical signal comprising the pilot signal in superposition on the information signal. The information signal is not substantially affected by the superposition and the separation for extraction. For the automatic equalizer according to this invention, the electric signal is made to comprise such a pilot signal in addition to the information signal and is delivered to the equalizer input terminal 23 (FIG. 1) as an equalizer input signal.

The pilot signal used in an automatic equalizer at a local end of a transmission path, is superposed on an information signal at a remote end of the transmission path. Another pilot signal is superposed on an information signal at the local end of another transmission path for use in a like automatic equalizer at the remote end. It is possible to use different frequencies for the pilot signals which are superposed on the respective information signals at the local and the remote ends. For each automatic equalizer, a pilot signal may continuously be sent through the transmission path irrespective of presence and absence of the information signal. Alternatively, the pilot signal may be sent only when the information signal is present. As a further alternative, the pilot signal may be sent periodically or otherwise intermittently with or without regard to the information signal. At any rate, the pilot signal of a single or a plurality of frequencies is used in any desired manner for the automatic equalizer.

Figure 6:
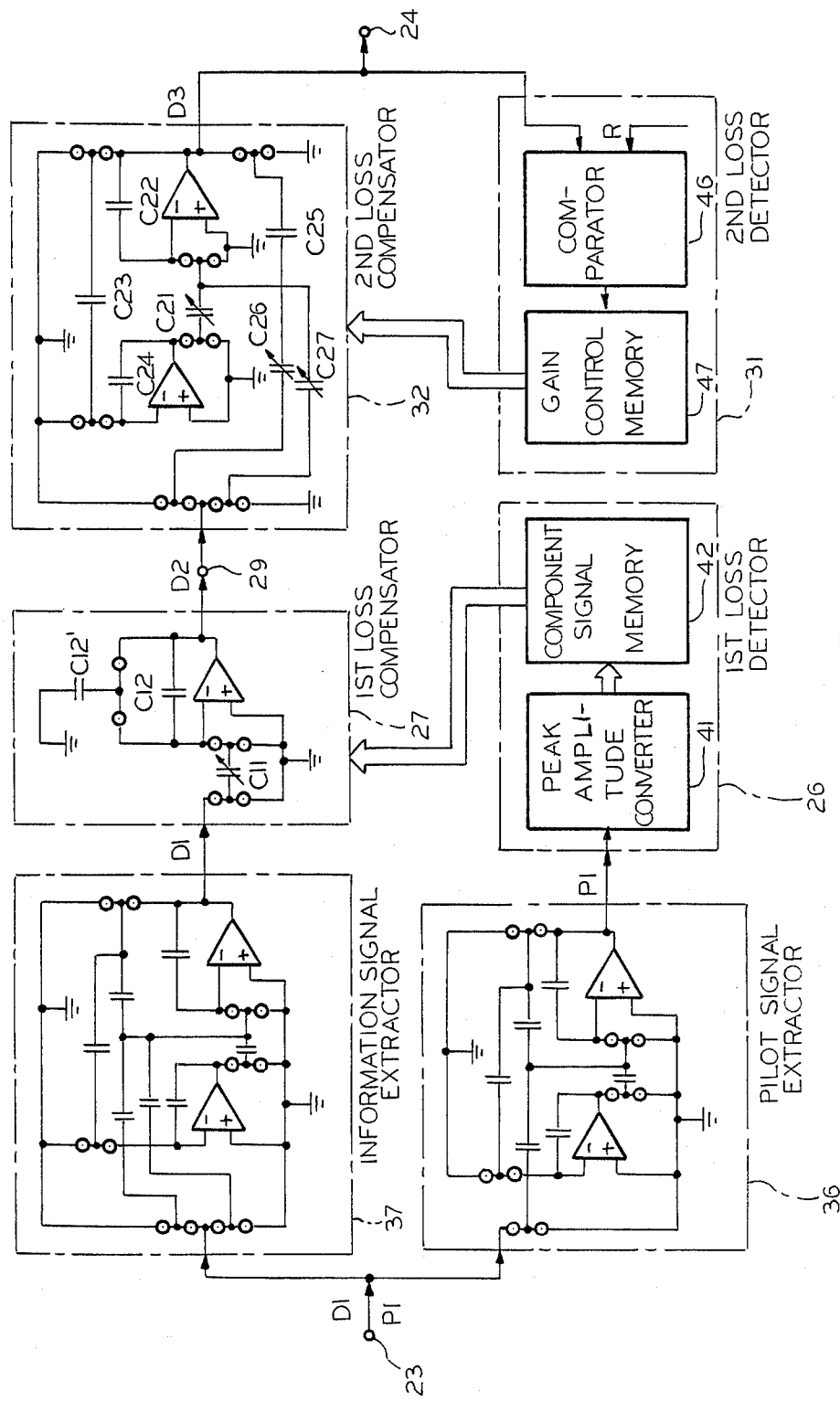
FIG. 6 shows partly in blocks an automatic equalizer according to a first embodiment of this invention.

Referring now to FIG. 6, description will proceed to an automatic equalizer according to a first embodiment of this invention. The equalizer has an equalizer input terminal 23, an equalizer output terminal 24, and an intermediate output terminal 29. The equalizer comprises first and second loss component detectors which can be regarded for the time being as equivalents of the first and the second loss component detecting arrangements 26 and 31 (FIG. 1) and will therefore be designated by like reference numerals. The equalizer further comprises first and second loss component compensators which are equivalents of the correspondingly named arrangements 27 and 32 and will be denoted by similar reference numerals. The second loss component compensator 32 will alternatively be called a variable gain amplifier for the reason which will become clear as the description proceeds.

The first loss component detector and compensator 26 and 27 have input terminals connected to the equalizer input terminal 23 through a pilot signal extractor 36 and an information signal extractor 37, respectively. Through a transmission path of the type described hereinabove, the input terminal 23 is supplied with an equalizer input signal which comprises an information signal D1 and a pilot signal P1. From the input signal, the pilot signal extractor 36 extracts the pilot signal P1 as a pilot signal component and delivers the pilot signal component to the first loss component detector 26. Similarly, the information signal extractor 37 extracts the information signal D1 as an information signal component and feeds the information signal component to the first loss component compensator 27. Inasmuch as the information signal D1 is not substantially affected by the extraction, the information signal component will be designated also by the reference symbol D1. The pilot signal component will likewise be designated by the reference symbol P1.

In the manner described before, the information signal D1 and the pilot signal P1 are equally subjected to the first loss component mentioned above. The first loss component detector 26 may detect a difference or error between a predetermined amplitude and an amplitude which the pilot signal component P1 has. The detector 26 thereby produces a control signal indicative of the difference. The first loss component compensator 27 has a variable or controllable gain which is independent of the frequency and may be attenuated. The control signal is for use in controlling the variable gain so that the compensator 27 may optimally compensate for the first loss component. The compensator 27 thereby delivers an intermediate output signal to the intermediate output terminal 29. The intermediate output signal consists essentially of a processed information signal D2 in which the afore-mentioned second loss component remains although the first loss component is compensated for.

The intermediate output signal is delivered to the second loss component compensator 32 of a variable gain or attenuation which is frequency dependent like the second loss component. In an initial state of operation of the automatic equalizer, the second loss component compensator 32 supplies the equalizer output terminal 24 with an equalizer output signal comprising a further processed information signal D3 in which the second loss component is not yet optimally compensated for. The equalizer output signal is fed backwardly to the second loss component detector 31. Like the first loss component detector 26, the second loss component detector 31 delivers a gain control signal to the second loss component compensator 32. The gain control signal controls the variable gain of the second loss component detector 32 so that the equalizer output signal may eventually converge to an equalized signal with the second loss component of the further processed signal D3 optimally compensated for, irrespective of modes of transmission of the pilot signal P1.

It is now understood that the first equalizer 21 (FIG. 1) comprises the first loss component detector 26 and compensator 27 and the pilot signal extractor 36. The second equalizer 22 comprises the second loss component detector 31 and compensator 32 and the information signal extractor 37. A combination of the second loss component detector 31 and compensator 32 to which the intermediate output signal is delivered, may be called an equalizer part of the second equalizer 22.

Through a series of operation described above, the first and the second equalizers 21 and 22 are cooperative in equalizing the equalizer input signal into the equalized signal. The second loss component compensator 32 eventually produces the further processed information signal D3 as the equalizer output signal in which the first and the second loss components are optimally compensated for.

Figure 7:
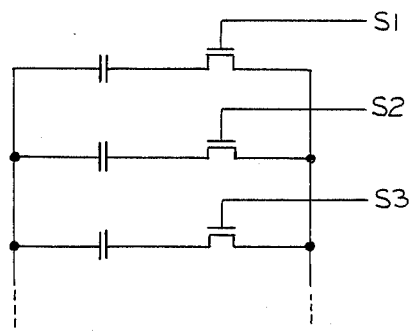
FIG. 7 shows a capacitor array used as a variable capacitor in the automatic equalizer depicted in FIG. 6.

Referring more particularly to FIG. 6 and additionally to FIG. 7, the pilot signal extractor 36 may be either a low-pass or a band-pass filter for the above-mentioned frequency band of the low frequency for the pilot signal P1. The information signal extractor 37 may be either a band-pass or a high-pass filter which cuts off the pilot signal P1 and allows passage of the information signal D1. Each filter may be a switched capacitor filter (SCF), an active filter, or a passive filter. In the example being illustrated, the pilot and the information signal extractors 36 and 37 are switched capacitor band-pass and high-pass filters, respectively.

Inasmuch as such an SCF is known in the art, the extractors 36 and 37 will not be described more in detail. If desired, reference should be had to any one of publications that is most readily available. Examples of such publications are an article contributed by P. E. Fleischer et al to "The Bell System Technical Journal," Vol. 58, No. 10 (December 1979), pages 2235–2269, under the title of "A Family of Active Switched Capacitor Biquad Building Blocks," and a book "Analog Filter Design" edited by M. E. Van Valkenburg, Chapter 17 of a title of "Switched Capacitor Filters" (pages 487–521 of the Holt-Saunders International Edition published 1982 in Japan). Incidentally, each unnumbered pair of small circles represents a transfer switch which accompanies a capacitor in the manner depicted also in the above-referenced Yumoto et al patent (FIGS. 2 and 4 thereof) and Suzuki et al paper (FIG. 1 thereof).

Each of the loss component compensators 27 and 32 is typically a variable gain amplifier having a variable gain (or attenuation). The variable gain may be given by a capacitor array which is depicted in FIG. 6 as a variable capacitor and comprises a plurality of component capacitors in the manner shown in FIG. 7. The component capacitors are selected by component signals S1, S2, S3, and so forth of the control signal produced by the first loss component detector 26 or of the gain control signal produced by the second loss component detector 27. The component signals S1 and others are for use in controlling MOS switches which are connected in series to the respective component capacitors.

It is known that the first loss component compensator 27 has a transfer function $T_1(z)$ which is defined by $V_{1.in}(z)$ of the information signal component D1 under $V_{1.out}(z)$ of the processed information signal D2 and is equal to minus $(C_{11}/C_{12})$ where $C_{11}$ and $C_{12}$ are representative of capacities of the variable and the fixed capacitors depicted in FIG. 6 with similar labels. The capacitor with a label $C_{12}'$ has a capacity which is equal to $C_{12}$. The second loss component compensator 32 has a transfer function $T_2(z)$ which is defined by $V_{2.in}(z)$ of the processed information signal D2 under $V_{2.out}(z)$ of the further processed information signal D3 and is equal to:

$$-[C_{24}C_{26} - C_{24}(C_{25} + C_{27})z^{-1} + C_{24}C_{27}z^{-2}] \div [C_{24}(C_{22} + C_{25}) + (C_{21}C_{23} - C_{24}(C_{25} + 2C_{22}))z^{-1} + C_{22}C_{24}z^{-2}],$$

where $C_{21}$ through $C_{27}$ are representative of capacities like the capacities $C_{11}$ and $C_{12}$.

The first loss component detector 26 may comprise a peak amplitude converter 41 and a component signal memory 42, which may be a read-only memory. Responsive to an amplitude which the pilot signal component P1 has, the converter 41 serves as an address signal generator which produces digital codes for use in accessing the memory 42 in which the component signals are preliminarily stored in the manner known in the art. The digital codes are determined by the first loss component. Supplied with the digital codes from the converter 41, the memory 42 delivers that at least one of the component signals to the first loss component compensator 27 which makes the compensator 27 produce the processed information signal D2 in the manner thus far described.

The second loss component detector 31 may comprise a comparator 46 for comparing the peak amplitude of the further processed information signal D3 with a reference amplitude R to produce a difference signal related to that part of the second loss component which may remain in the further processed information signal D3 in comparison with the reference amplitude R. A gain control signal memory 47 is similar to the component signal memory 42 and produces component signals, such as S1, of the gain control signal.

Figure 8:
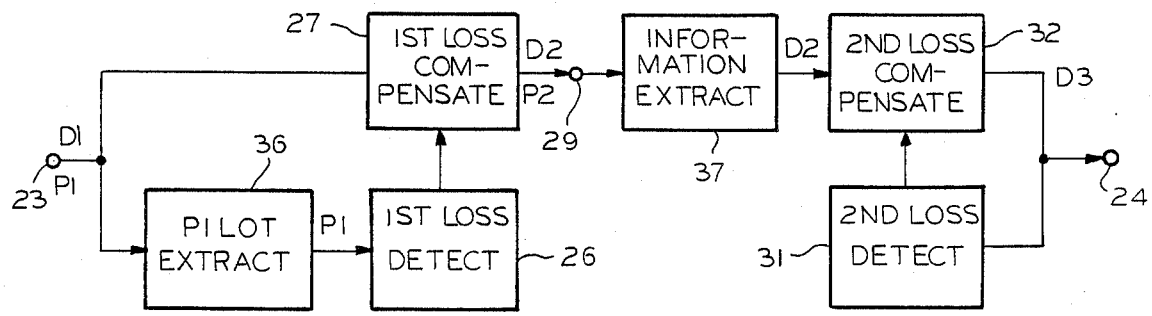
FIG. 8 is a block diagram of an automatic equalizer according to a second embodiment of this invention.

Referring to FIG. 8, an automatic equalizer according to a second embodiment of this invention comprises similar parts which are designated by like reference numerals. The first loss component compensator 27 is connected directly to the equalizer input terminal 23 rather than through the information signal extractor 37. The first loss component compensator 27 therefore supplies the intermediate output terminal 29 with an intermediate output signal which consits essentially of a processed information signal D2 and a processed pilot signal P2. The first loss component is compensated for, both in the processed information and pilot signals D2 and P2.

The information signal extractor 37 is supplied with the intermediate output signal and extracts the processed information signal D2 as the information signal component, which will agin be designated by the reference symbol D2. The automatic equalizer being illustrated, is similar in other respects to the automatic equalizer illustrated with reference to FIG. 6.

Figure 9:
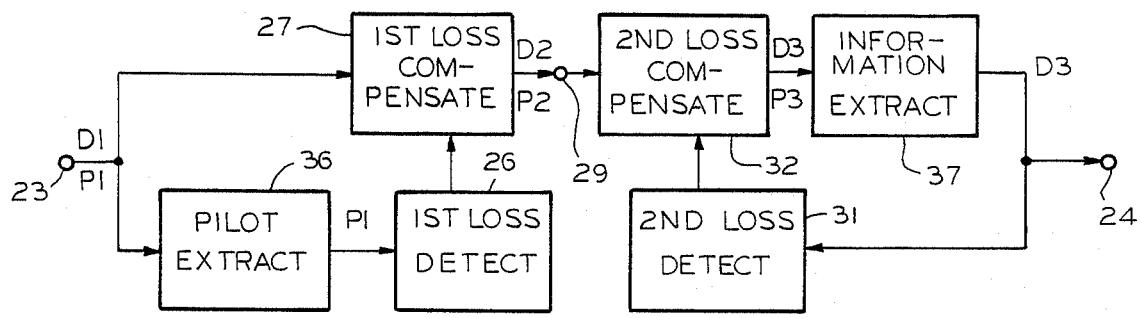
FIG. 9 is a block diagram of an automatic equalizer according to a third embodiment of this invention.

Turning to FIG. 9, an automatic equalizer according to a third embodiment of this invention comprises the second loss component compensator 32 connected directly to the intermediate output terminal 29 rather than through the information signal extractor 37. The second loss component compensator 32 therefore produces a further processed information signal D3 and a further processed pilot signal P3 collectively as an output signal, which will be called an amplifier output signal merely for convenience of description. In the manner described in conjunction with FIG. 6, the further processed information signal D3 has the second loss component eventually compensated for. Inasmuch as the pilot signal P1 is not susceptible to the second loss component, the further processed pilot signal P3 is substantially the same as the processed pilot signal P2 produced by the first loss component compensator 27.

The information signal extractor 37 is supplied with the amplifier output signal and delivers the equalizer output signal to the equalizer output terminal 24. In the meantime, the information signal extractor 37 extracts the further processed information signal D3 as the information signal component. As in the description so far given, the information signal component is indicated by the reference symbol D3. In other respects, the automatic equalizer under consideration is similar in structure and operation to the automatic equalizer illustrated with reference to FIG. 6.

Figure 10:
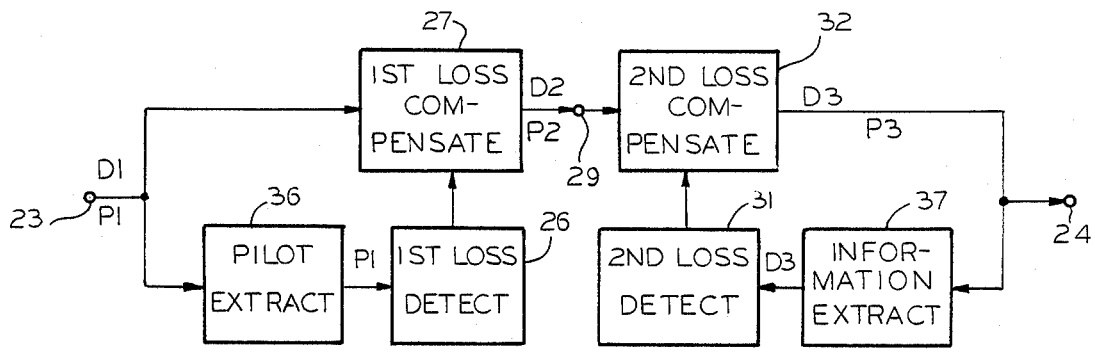
FIG. 10 is a block diagram of an automatic equalizer according to a fourth embodiment of this invention.

Further turning to FIG. 10, an automatic equalizer according to a fourth embodiment of this invention comprises the second loss component compensator 32 which delivers the amplifier output signal of the type described directly to the equalizer output terminal 24 as the equalizer output signal rather than through the information signal extractor 37. The equalizer output signal is fed back to the information signal extractor 37, which extracts the further processed information signal D3 as the information signal component which is again designated by the reference symbol D3. In other respects, structure and operation are similar to those described in connection with FIG. 9.

Figure 11:
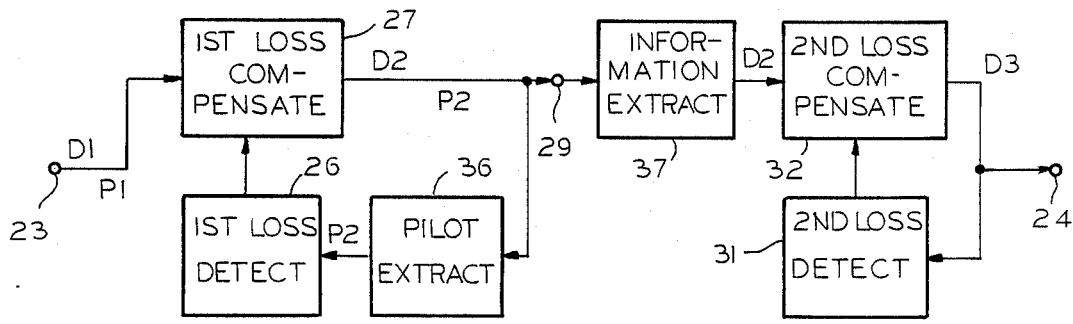
FIG. 11 is a block diagram of an automatic equalizer according to a fifth embodiment of this invention.

Referring to FIG. 11, an automatic equalizer according to a fifth embodiment of this invention comprises the pilot signal extractor 36 which is not connected to the equalizer input terminal 23 directly but through the first loss component compensator 27. In an initial state of operation of the automatic equalizer, the first loss component compensator 27 may not be adapted to optimally equalize the information and the pilot signals D1 and P1 of the equalizer input signal as regards the first loss component. At least a part of the first loss component may therefore remain both in the processed information and pilot signals D2 and P2.

Responsive to the intermediate output signal, the pilot signal extractor 36 extracts the processed pilot signal P2 as the pilot signal component which will be indicated by the reference symbol P2 as before. The first loss component detector 26 detects the first loss component is response to the pilot signal component P2. The control signal soon adapts the first loss component compensator 27 to make the latter produce the intermediate output signal with both the processed information and pilot signals D2 and P2 optimally compensated for the first loss component. The second equalizer is similar to that of the automatic equalizer illustrated with reference to FIG. 8.

Figure 12:
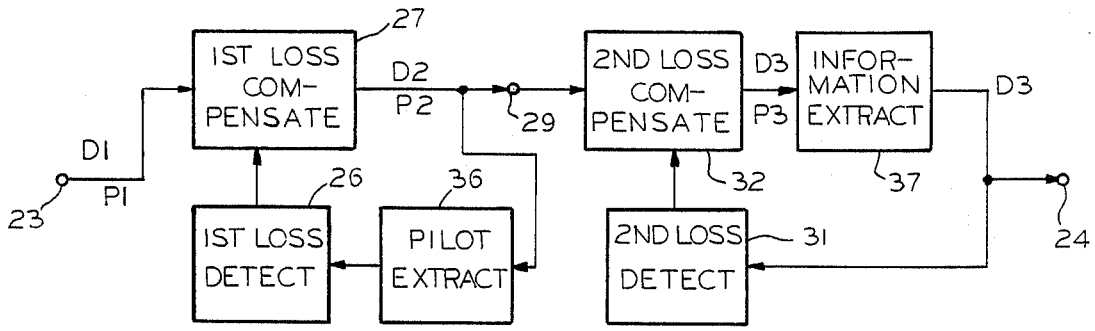
FIG. 12 is a block diagram of an automatic equalizer according to a sixth embodiment of this invention.

Turning to FIG. 12, an automatic equalizer according to a sixth embodiment of this invention comprises a first equalizer which is similar to that described in conjunction with FIG. 11. The second equalizer is similar to that described in connection with FIG. 9.

Figure 13:
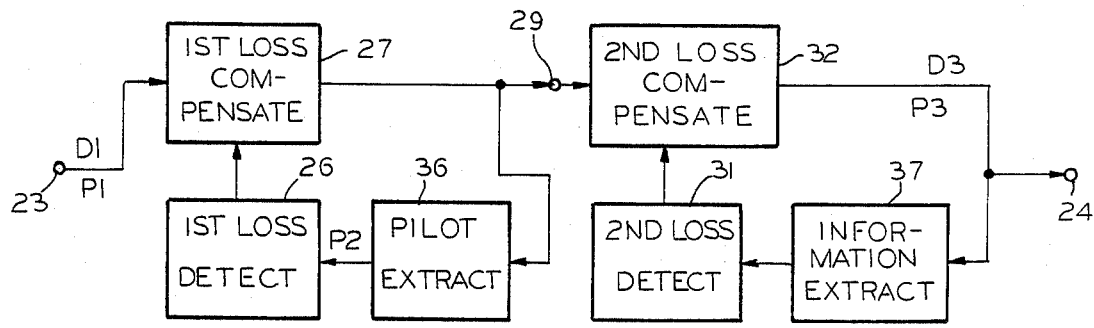
FIG. 13 is a block diagram of an automatic equalizer according to a seventh embodiment of this invention.

Further turning to FIG. 13, an automatic equalizer according to a seventh embodiment of this invention comprises a first equalizer which is again similar to that described in conjunction with FIG. 11. The second equalizer is similar to that described in connection with FIG. 10.

Reviewing FIGS. 6 through 13, it is now appreciated that the first and the second loss component detecting arrangements 26 and 27 (FIG. 1) are more exact equivalents of a combination of the pilot signal extractor 36 and the first loss component detector 26 described in connection with FIG. 6 or any one of FIGS. 8 through 10 and another combination of the information signal extractor 37 and the second loss component detector 31 described in conjunction with FIG. 10 or 13, respectively. At any rate, the automatic equalizer illustrated with reference to FIGS. 6 and 8 through 13 are operable with the pilot and the information signal components derived either directly or indirectly from the pilot and the information signals, respectively. This applies to other automatic equalizers which will be illustrated in the following.

Figure 14:
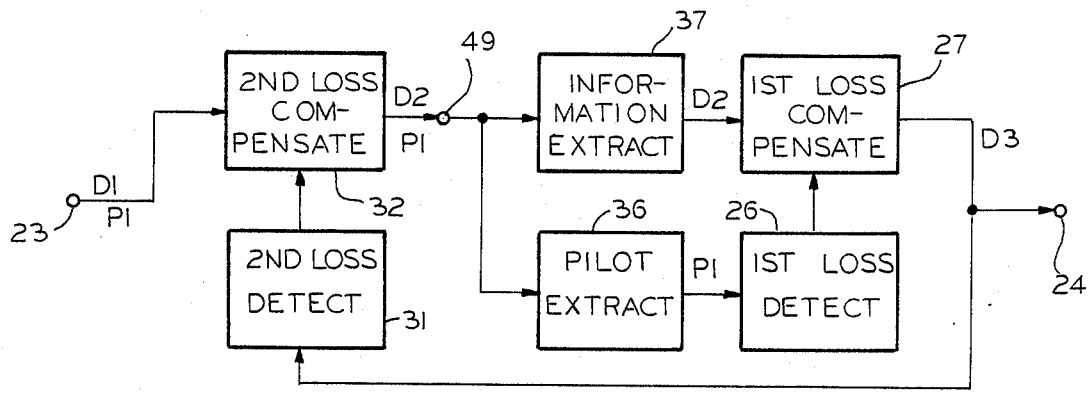
FIG. 14 is a block diagram of an automatic equalizer according to an eighth embodiment of this invention.

Referring now to FIG. 14, an automatic equalizer according to an eighth embodiment of this invention comprises the second loss component compensator 32 connected directly to the equalizer input terminal 23. The second loss component compensator 32 produces an output signal which will be called an amplifier output signal as above. The amplifier output signal is delivered to a terminal 49 which will be referred to for convenience as an amplifier output terminal. The amplifier output signal consists essentially of a processed information signal and a processed pilot signal In an initial state of operation of the automatic equalizer, the second loss component compensator 32 may not be optimally adapted to compensation of the second loss component. The second loss component is, however, eventually optimally compensated for in the manner which will presently become clear. At any rate, the processed information signal will be designated by the reference symbol D2 although the compensation is for the second loss component rather than for the first loss component. Irrespective of insufficient or optimum compensation for the second loss component, the processed pilot signal is substantially tha same as the pilot signal P1 of the equalizer input signal. The processed pilot signal will therefore be denoted by the reference symbol P1.

The pilot and the information signal extractors 36 and 37 are supplied with the amplifier output signal from the amplifier output terminal 49. The pilot signal extractor 36 extracts the processed pilot signal P1 from the amplifier output signal as the pilot signal component which is once again designated by the reference symbol P1. The information signal extractor 37 extracts the processed information signal D2 as the information signal component. Inasmuch as the processed information signal D2 is not affected by the extraction, the information signal component will be denoted by the reference symbol·D2.

Except for the fact that the information signal component D2 has the second loss component compensated for either only to a certain degree or eventully to an optimum degree, the first equalizer is operable as in the automatic equalizer illustrated with reference to FIG. 6. The first loss component compensator 27 produces an output signal which will be called a local output signal merely for convenience of description.

In the example being illustrated, the local output signal consists essentially of a further processed information signal D3 in which the first loss component is optimally compensated for and in which the second loss component is eventually optimally compensated for. Fed back with the local output signal, the second loss component detector 31 detects that part of the second loss component which may remain in the further processed information signal D3. The second loss component detector 31 thereby controls the second loss component compensator 32 by the gain control signal of the type described. The first loss component compensator 27 delivers the local output signal to the equalizer output terminal 24 as the equalizer output signal.

Figure 15:
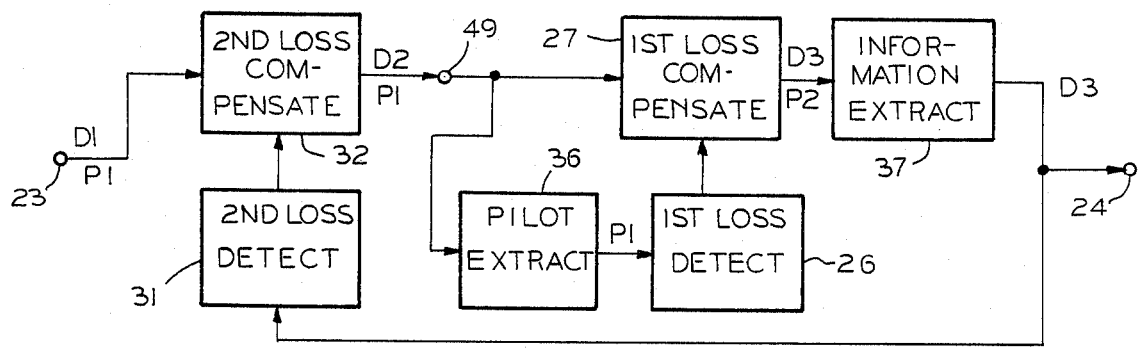
FIG. 15 is a block diagram of an automatic equalizer according to a ninth embodiment of this invention.

Turning to FIG. 15, an automatic equalizer according to a ninth embodiment of this invention is similar to that illustrated with reference to FIG. 14 insofar as the above-mentioned equalizer part of the second equalizer, the pilot signal extractor 36, and the first loss component detector and compensator 26 and 27 are concerned. The amplifier output signal is, however, not delivered to the first loss component compensator 27 through the information signal extractor as is done in FIG. 14, but is delivered directly to compensator 27. The first loss component compensator 27 therefore produces an output signal which will again be called a local output signal. Being different from the local output signal described in conjunction with FIG. 14, the local output signal now comprises a further processed information signal D3 and a further processed pilot signal P2. In each of the further processed information and pilot signals D3 and P2, the first loss component is optimally compensated for. The second loss component may remain only in the further processed information signal D3 because the pilot signal P1 is not subjected to the second loss component but only to the first loss component.

Responsive to the local output signal, the information signal extractor 37 extracts the further processed information signal D3 as the information signal component which is again denoted by the reference symbol D3. Like the second equalizer so far described, the gain control signal makes the processed information signal D2 of the amplifier output signal have the second loss component eventually compensated for. The information signal extractor 27 delivers the information signal component D3 to the equalizer output terminal 24 as the equalizer output signal.

Figure 16:
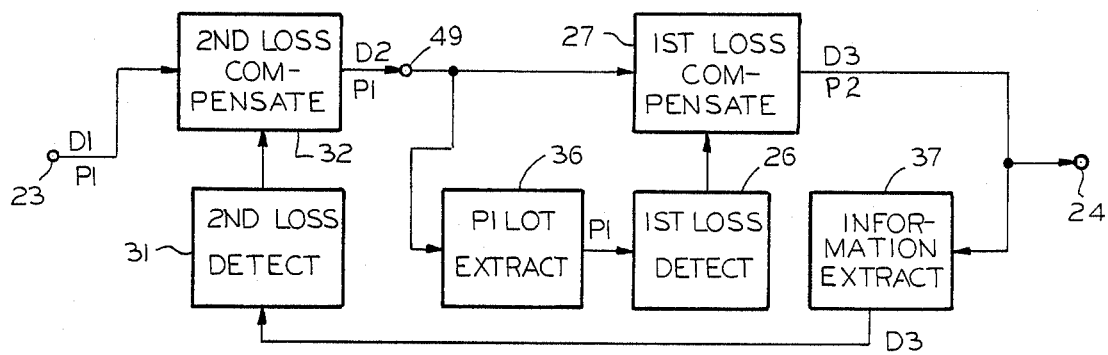
FIG. 16 is a block diagram of an automatic equalizer according to a tenth embodiment of this invention.

Turning further to FIG. 16, an automatic equalizer according to a tenth embodiment of this invention is similar to that illustrated with reference to FIG. 15. The first loss component compensator 27, however, delivers the local output signal directly to the equalizer output terminal 24 as the equalizer output signal rather than through the information signal extractor 37.

Figure 17:
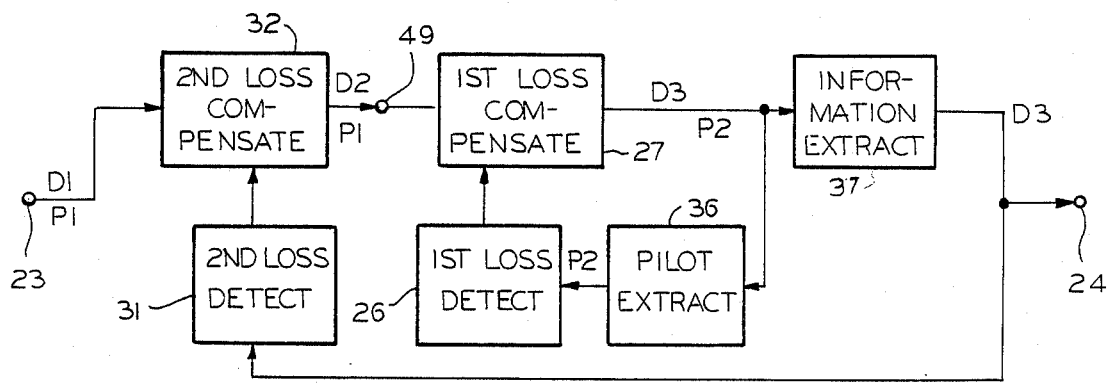
FIG. 17 is a block diagram of an automatic equalizer according to an eleventh embodiment of this invention.

Referring to FIG. 17, an automatic equalizer according to an eleventh embodiment of this invention is similar to that illustrated with reference to FIG. 15 as regards the second equalizer. The first equalizer is similar to those described in conjunction with FIGS. 11 through 13 and is operable like those described in connection with FIGS. 15 and 16. The information signal extractor 37 delivers the information signal component D3 to the equalizer output terminal 24 as the equalizer output signal.

Figure 18:
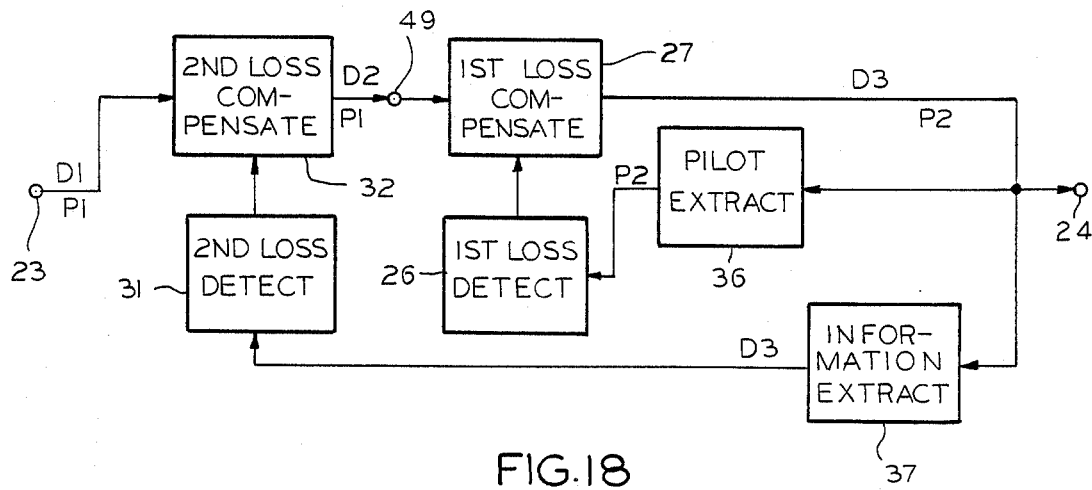
FIG. 18 is a block diagram of an automatic equalizer according to a twelfth embodiment of this invention.

Finally referring to FIG. 18, an automatic equalizer according to a twelfth embodiment of this invention is similar to that illustrated with reference to FIG. 17. The first loss component compensator 27, however, delivers the local output signal directly to the equalizer output terminal 24 as the equalizer output signal rather than through the information signal extractor 37.

While this invention has thus far been described in specific conjunction with an appreciable number of preferred embodiments thereof and in connection with various modes of transmission of the pilot signal P1 for use in such automatic equalizers, it will now be readily possible for one skilled in the art to put this invention into practice in various other manners. For example, it is possible to supply the automatic equalizer with an analog equalizer input signal converted to a digital equalizer input signal by an analog-to-digital converter (not shwon). In this event, the digital equalizer input signal is digitally processed by any one of the automatic equalizers so far described.

What is claimed is:

1. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:
    said input signal comprising a pilot signal in addition to an information signal, said information signal experiencing both said first and said second loss components and said pilot signal experiencing only said first loss component, and that
    said first equalizer comprises:
    first loss component detecting means coupled to respond to said input signals received over said transmission path and responsive to a pilot signal component derived from said pilot signal and having said no frequency dependency for detecting said first loss component to produce a control signal;
    said second equalizer comprises a variable gain amplifier coupled to respond to receipt of said input signal for producing an amplifier output signal which comprises a processed information signal and a processed pilot signal;
    said first loss component detecting means comprising a pilot signal extractor responsive to said amplifier output signal for extracting said processed pilot signal as said pilot signal component, and a first loss component detector responsive to said pilot signal component for detecting said first loss component to produce said control signal;
    said second equalizer further comprising an information signal extractor responsive to said amplifier output signal for extracting said processed information signal as said information signal component;
    first loss component compensating means being responsive to said information signal component and said control signal for compensating for said first loss component to produce a local output signal;
    said second equalizer still further comprising a second loss component detector responsive to said local output signal for detecting said second loss component to produce a gain control signal, and means for supplying said gain control signal to said variable gain amplifier to make said processed information signal have said second loss component eventually compensated for;
    said first loss component compensating means producing said local output signal as said equalizer output signal.

2. In an automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:
    said input signal comprising a pilot signal in addition to an information signal, said information signal experiencing both said first and second loss components and said pilot signal experiencing only said first loss component; and that:
    said first equalizer comprises:

first loss component response means coupled to respond to said input signals received over said transmission path and responsive to a pilot signal component derived from said pilot signal and having said no frequency dependency for detecting said first loss component to produce a control signal; and having:

first loss component compensating means responsive to said input and control signals for compensating for said first loss component to produce an intermediate output signal including said information signal;

said second amplifier comprising:

second loss component detecting means responsive to said intermediate output signal to produce a second control signal indicating an amount of compensation required for said second loss component; and second loss compensating means responsive to said intermediate output signal including said information signal for compensating for said second loss component in response to said second control signal produced by said second loss component detecting means; and means responsive to the output of said second equalizer for providing an output signal from said automatic equalizer.

3. An automatic equalizer as claimed in claim 2, wherein:

said first equalizer further comprises an information signal extractor means responsive to said input signal for extracting said information signal as an information signal component;

said first loss component compensating means being further responsive to said information signal component for compensating for said first loss component to produce said intermediate output signal;

said second equalizer further comprising an equalizer part responsive to said intermediate output signal for compensating for said second loss component to produce said equalizer output signal.

4. An automatic equalizer as claimed in claim 2, wherein:

said first loss component compensating means is further responsive to said input signal for compensating for said first loss component to produce said intermediate output signal which comprises a processed information signal having said first loss component compensated for;

said second equalizer comprising an information signal extractor responsive to said intermediate output signal for extracting said processed information signal as an information signal component, and an equalizer part responsive to said information signal component for compensating for said second loss component to produce an equalizer output signal.

5. An automatic equalizer as claimed in claim 2, wherein:

said first loss component compensating means is responsive to said input and said control signals for compensating for said first loss component to produce said intermediate output signal comprising a processed information signal and a processed pilot signal which have said first loss component compensated for;

said first loss component response means comprising a pilot signal extractor responsive to said intermediate output signal for extracting said processed pilot signal as said pilot signal component, and a first loss component detector responsive to said pilot signal component for detecting said first loss component to produce an output signal as said control signal; and said second equalizer being responsive to an information component derived from said processed information signal.

6. An automatic equalizer as claimed in claim 5, wherein said second equalizer comprises an information signal extractor responsive to said intermediate output signal for extracting an processed information signal as a second processed information signal component, and an equalizer part responsive to said information signal component for compensating for said second loss component to produce said equalizer output signal.

7. An automatic equalizer as claimed in claim 5, wherein said second equalizer comprises a variable gain amplifier responsive to said intermediate output signal for producing an amplifier output signal which comprises a further processed information signal, an information signal extractor responsive to said amplifier output signal for extracting said further processed information signal as a second processed information signal component, a second loss component detector responsive to said information signal component for detecting said second loss component to produce a gain control signal, and means for supplying said gain control signal to said variable gain amplifier to make said further processed information signal have said second loss component eventually compensated for, said information signal extractor thereby producing said information signal component as said equalizer output signal.

8. An automatic equalizer as claimed in claim 5, wherein said second equalizer comprises a variable gain amplifier responsive to said intermediate output signal for producing an amplifier output signal which comprises a further processed information signal, an information signal extractor responsive to said amplifier output signal for extracting said further processed information signal as a second processed information signal component, a second loss component detector responsive to said information signal component for detecting said second loss component to produce a gain control signal, and means for supplying said gain control signal to said variable gain amplifier to make said further processed information signal have said second loss component eventually compensated for, said variable gain amplifier thereby producing said amplifier output signal as said equalizer output signal.

9. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:

said input signal comprising a pilot signal in addition to an information signal, said information signal experiencing both said first and said second loss components and said pilot signal experiencing only said first loss component; and that said first equalizer comprises:

first loss component detecting means coupled to respond to said input signals received over said transmission path and responsive to a pilot signal component derived from said pilot signal and having said no frequency dependency for detecting said first loss component to produce a control signal; and first loss component compensating means being responsive to said input and said control signals for compensating for said first loss component to produce an intermediate output signal which comprises a processed information signal having said first loss component compensated for;

said second equalizer comprising a variable gain amplifier responsive to said intermediate output signal for producing an amplifier output signal which comprises a further processed information signal, an information signal extractor responsive to said amplifier output signal for extracting said further processed information signal as an information signal component, a second loss component detector responsive to said information signal component for detecting said second loss component to produce a gain control signal, and means for supplying said gain control signal to said variable gain amplifier to compensate said further processed information signal for said second loss component, said information signal extractor producing said information signal component as said automatic equalizer output signal.

10. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:

said input signal comprising a pilot signal in addition to an information signal, said information signal experiencing both said first and said second loss components and said pilot signal experiencing only said first loss component, and that said first equalizer comprises:

first loss component detecting means coupled to respond to said input signals received over said transmission path and responsive to a pilot signal component derived from said pilot signal and having said no frequency dependency for detecting said first loss component to produce a control signal; first loss component compensating means being responsible to said input and to said control signals for compensating for said first loss component to produce an intermediate output signal which comprises a processed information signal having said first loss component compensated for;

said second equalizer comprising a variable gain amplifier responsive to said intermediate output signal for producing an amplifier output signal which comprises a further processed information signal, an information signal extractor responsive to said amplifier output signal for extracting said further processed information signal as an information signal component, second loss component detector responsive to said information signal component for detecting said second loss component to produce a gain control signal, and means for supplying said gain control signal to said variable gain amplifier to compensate said further processed information signal for said second loss component, said variable gain amplifier producing said amplifier output signal as an equalizer output signal.

11. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:

said input signal comprising a pilot signal in addition to an information signal, said information signal experiencing both said first and said second loss components and said pilot signal experiencing only said first loss component, and that:

said first equalizer comprises:

first loss component response means coupled to respond to said input signals received over said transmission path and responsive to a pilot signal component derived from said pilot signal and having said no frequency dependency for detecting said first loss component to produce a control signal; and said second equalizer comprises a variable gain amplifier coupled to respond to receipt of input signal for producing an amplifier output signal which comprises a processed information signal and a processed pilot signal;

first loss component compensating means being responsive to said amplifier output signal and said control signal for compensating for said first loss component to produce a local output signal which comprises a further processed information signal and a further processed pilot signal;

said first loss component response means comprising a pilot signal extractor responsive to said amplifier output signal for extracting said further processed pilot signal as said pilot signal component, and a first loss component detector responsive to said pilot signal component for detecting said first loss component to produce said control signal;

said second equalizer further comprising an information signal extractor responsive to said local output signal for extracting said further processed information signal as said information signal component, a second loss component detector responsive to said information signal component for detecting said second loss component to produce a gain control signal, and means for supplying said gain control signal to said variable gain amplifier to make the processed information signal of said amplifier output signal have said second loss component eventually compensated for;

said first loss component compensating means producing said local output signal as said equalizer output signal.

12. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:

said input signal comprising a pilot signal in addition to an information signal, said information signal experiencing both said first and said second loss components and said pilot signal experiencing only said first loss component, and that:

said first equalizer comprises:

first loss component detecting means coupled to respond to said input signals received over said transmission path and responsive to a pilot signal component derived from said pilot signal and having said no frequency dependency for detecting said first loss component to produce a control signal; and said second equalizer comprises a variable gain amplifier coupled to respond to receipt of said input signal for producing an amplifier output signal which comprises a processed information signal and a processed pilot signal;

said first loss component detecting means comprising a pilot signal extractor responsive to said amplifier output signal for extracting said processed pilot signal as said pilot signal component, and a first loss component detector responsive to said pilot signal component for detecting said first loss component to produce said control signal;

first loss component compensating means being responsive to said amplifier output signal and said control signal for compensating for said first loss component to produce a local output signal which comprises a further processed information signal;

said second equalizer further comprising an information signal extractor responsive to said local output signal for extracting said further processed information signal as said information signal component, a second loss component detector responsive to said information signal component for detecting said second loss component to produce a gain control signal, and means for supplying said gain control signal to said variable gain amplifier to make the processed information signal of said amplifier output signal have said second loss component eventually compensated for, said information signal extractor producing said information signal component as said equalizer output signal.

13. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second equalizer for separately compensating for said first and second loss components, respectively; the improvement comprising:

said input signal comprising a pilot signal in addition to an information signal, said information signal experiencing both said first and said second loss components and said pilot signal experiencing only said first loss component, and that:

said first equalizer comprises:

first loss component detecting means coupled to respond to said input signals received over said transmission path and responsive to a pilot signal component derived from said pilot signal and having said no frequency dependency for detecting said first loss component to produce a control signal; and said second equalizer comprises a variable gain amplifier coupled to respond to receipt of said input signal for producing an amplifier output signal which comprises a processed information signal and a processed pilot signal;

said first loss component detecting means comprising a pilot signal extractor responsive to said amplifier output signal for extracting said processed pilot signal as said pilot signal component, and a first loss component detector responsive to said pilot signal component for detecting said first loss component to produce said control signal;

first loss component compensating means being responsive to said amplifier output signal and said control signal for compensating for said first loss component to produce a local output signal which comprises a further processed information signal;

said second equalizer further comprising an information signal extractor responsive to said local output signal for extracting said further processed information signal as said information signal component, a second loss component detector responsive to said information signal component for detecting said second loss component to produce a gain control signal, and means for supplying said gain control signal to said variable gain amplifier to make the processed information signal of said amplifier output signal have said second loss component eventually compensated for;

said first loss component compensating means producing said local output signal as said equalizer output signal.

14. An automatic equalizer responsive to an equalizer input signal supplied through a transmission path with said input signal being subjected to a transmission loss for producing an equalizer output signal, said transmission loss being classified into a first loss component having substantially no frequency dependency and a second loss component having substantially a frequency dependency, respectively, said automatic equalizer comprising a first and a second amplifier for separately compensating for said first and second loss components, respectively; the improvement comprising:

said input signal comprising a pilot signal in addition to an information signal, said information signal experiencing both said first and said second loss components and said pilot signal experiencing only said first loss component, and that:

said first equalizer comprises:

first loss component response means coupled to respond to said input signals received over said transmission path and responsive to a pilot signal component derived from said pilot signal and having said no frequency dependency for detecting said first loss component to produce a control signal; and said second equalizer comprises a variable gain amplifier coupled to respond to receipt of said input signal for producing an amplifier output signal which comprises a processed information signal and a processed pilot signal;

said first loss component response means having a compensating means which is responsive to said amplifier output signal and said control signal for compensating for said first loss component to produce a local output signal which comprises a further processed information signal and a further processed pilot signal;

said first loss component response means including detecting means comprising a pilot signal extractor responsive to said amplifier output signal for extracting said processed pilot signal as said pilot signal component, and a first loss component detector responsive to said pilot signal component for detecting said first loss component to produce said control signal;

said second equalizer further comprising an information signal extractor responsive to said local output signal for extracting said further processed information signal as said information signal component, a second loss component detector responsive to said information signal component for detecting said second loss component to produce a gain control signal, and means for supplying said gain control signal to said variable gain amplifier to make the processed information signal of said amplifier output signal have said second loss component eventually compensated for, said information signal extractor producing said information signal component as said equalizer output signal.

* * * * *